United States Patent [19]

Salisbury

[11] Patent Number: 5,313,319
[45] Date of Patent: May 17, 1994

[54] ACTIVE ARRAY STATIC PROTECTION DEVICES

[75] Inventor: Roger S. Salisbury, Niskayuna, N.Y.

[73] Assignee: General Electric Company, Schenectady, N.Y.

[21] Appl. No.: 899,976

[22] Filed: Jun. 17, 1992

[51] Int. Cl.$^5$ .............................................. G02F 1/133
[52] U.S. Cl. .................................... 359/60; 359/54; 359/59; 257/356; 257/363
[58] Field of Search ............... 359/54, 55, 59, 87, 359/88; 250/208.1, 208.2, 208.3; 361/311, 312, 313, 322, 17; 357/23.13; 257/56, 355, 356, 357, 358, 359, 360, 363, 532

[56] References Cited

U.S. PATENT DOCUMENTS

| | | | |
|---|---|---|---|
| 4,688,896 | 8/1987 | Castleberry | 350/333 |
| 4,803,536 | 2/1989 | Tuan | 357/23.13 |
| 5,019,002 | 5/1991 | Holmberg | 445/24 |
| 5,027,174 | 6/1991 | Mimoto | 357/23.13 |
| 5,068,748 | 11/1991 | Ukai et al. | 359/59 |
| 5,141,898 | 8/1992 | Lapham | 357/23.12 |
| 5,195,010 | 3/1993 | Dresner | 257/356 |

OTHER PUBLICATIONS

IBM Technical Disclosure Bulletin, Nov. 1978, "Electrostatic Discharge Protection of FET Gates with Thin Film Capacitors", Wright.

*Primary Examiner*—William L. Sikes
*Assistant Examiner*—Kenneth Parker
*Attorney, Agent, or Firm*—Donald S. Ingraham; Marvin Snyder

[57] ABSTRACT

An active electrical array wafer includes a substrate on which are disposed a plurality of layers of electrically conductive components, such as sets of address lines (for example scan and data lines) that are electrically insulated from one another by a dielectric material. Static protection capacitors to protect against the discharge of static potential between the layers of electrically conductive components are disposed at selected points on the wafer. A static protection line is disposed so as to cross over scan or data lines extending from the active area of the array towards the edge of the wafer. A dielectric material, such as the dielectric material separating the scan and data lines in the active area of the array, is disposed between the static protection line and the crossing-over address line, thereby forming a capacitor in which the two electrodes are the overlying portions of the respective address line and the static protection line. The capacitance of the static protection capacitor is selected, for example by determining the width of the scan protection line, to cause the static protection capacitor to exhibit electrical breakdown before a static potential causes an electrical breakdown between conductive components in the active portion of the array.

10 Claims, 2 Drawing Sheets

ACTIVE ARRAY STATIC PROTECTION DEVICES

BACKGROUND OF THE INVENTION

This invention relates generally to thin film electronic active arrays such as liquid crystal displays or imager arrays and more particularly to static protection devices in displays or imagers having a matrix of electrically conductive transmission lines for controlling active components in such arrays.

Arrays of active electronic devices, such as photodiodes or liquid crystal cells and their associated electrical address lines and switching devices, are typically fabricated on wafers for ease of assembly, testing, and installation in operating equipment. Such arrays typically have one or more layers of electrically conductive components which are electrically insulated from the other. During the fabrication and testing process, static voltages between the layers can rise and fall rapidly as a result of, for example, fabrication process steps (such as metal deposition or reactive ion etching), handling, or application of test voltages.

These static voltages may become large enough to result in the breakdown of dielectric material disposed between the overlying layers of electronic components, destroying or damaging the electronic component at the location where the breakdown occurred. The point at which breakdown occurs is a function of the static voltage, the nature and structure of the dielectric and other materials (such as layers of semiconductor material) disposed between the layers of electrically conductive components, and the surface area of those components. Specifically, breakdown typically occurs at locations in the array which have a relatively small capacitance and are thus less capable of easily withstanding increases in voltage potential between the conductive layers. Differences of potential as low as 50 volts can cause breakdown in some imager arrays. If the number of electronic components damaged or destroyed exceeds the repair capability of the wafer, for example the number of repair lines available to electrically isolate a damaged component (such as is disclosed in U.S. Pat. No. 4,688,896, issued Aug. 25, 1987 to D. E. Castleberry and assigned to the assignee of the present invention), or the operational tolerance for defective devices in the array, the wafer is unusable and must be scrapped.

It is thus an object of this invention to provide an array of electronic components that includes protection from static voltage discharge damage for active components on the array.

It is a further object of this invention to provide an array having static protection capacitors sized such that they exhibit breakdown at static voltages sufficiently low to protect the layers of electrically conductive components forming active components on the wafer.

It is yet a further object of this invention to provide a liquid crystal or photodiode array of enhanced manufacturing yield that is readily fabricated on a wafer and economical to produce.

SUMMARY OF THE INVENTION

In accordance with this invention, a wafer having an array of active electronic components includes a first layer of electrically conductive components disposed on the wafer and a second layer of electrically conductive components. The two layers of electrically conductive components are electrically insulated from one another by at least one dielectric layer disposed therebetween. The wafer further includes at least one static protection capacitor electrically coupled to one of the layers of electrically conductive components. The static protection capacitor can be either electrically coupled to a grounding ring disposed on the wafer or "floating", i.e., not directly coupled to a ground connection. Each of the static protection capacitors has a predetermined capacitance so that it will exhibit electrical breakdown at a selected threshold static potential to prevent dissipation of static potential between the first and second layers of the electrically conductive components.

The static protection capacitors are preferably formed by an electrically conductive static protection line that is disposed on the wafer to cross over address lines extending from the active portion of the array towards the edges of the wafer. A layer of dielectric material is disposed between respective portions of the static protection line and the address line at each crossover point. The dielectric material is advantageously the same material that is used elsewhere on the wafer for the fabrication of active components in the array. The capacitance of each static protection capacitor is readily determined in the fabrication process by selecting the width of the static protection line at each crossover point (thereby varying the area of the conductors forming the capacitor) to provide the desired capacitance. The static protection line is typically coupled to the electrically conductive grounding ring. In an array of active devices, such as liquid crystal cells, photodiodes, or the like, one or more static protection capacitors are advantageously disposed on each address line for the active components.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawings in which like characters represent like parts throughout the drawings, and in which:

FIG. 2b is a cross-sectional view of a static protection capacitor in accordance with this invention taken along the line 2B—2B in FIG. 2a.

DETAILED DESCRIPTION OF THE INVENTION

Figure 1:
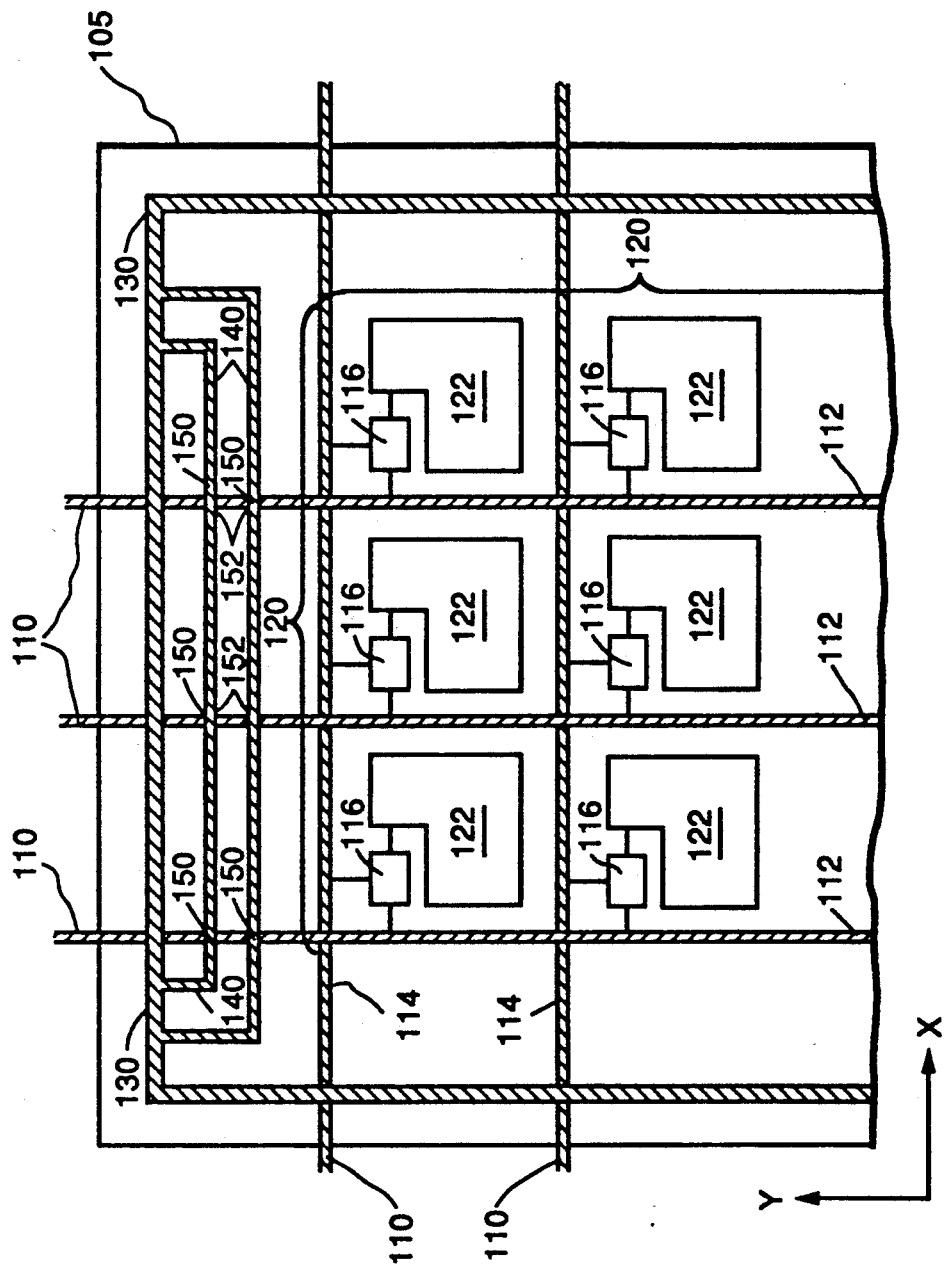
FIG. 1 is a plan view of a portion of an active array on a wafer having static protection capacitors in accordance with this invention.

As illustrated in FIG. 1, an electrical array wafer 100 comprises a substrate 105. Substrate 105 typically comprises a dielectric material, such as glass or the like, which has a surface on which a plurality of layers of electrically conductive components are disposed. For example, a plurality of address lines 110 arranged in rows and columns are respectively oriented along x- and y-directions to form a matrix arrangement and are disposed in two respective layers on the wafer. The two layers of address lines 110 are electrically insulated from the other. Each address line 110 oriented along the x-axis as shown in FIG. 1 is commonly referred to as a data line 112, and each address line 110 oriented along the y-axis as illustrated in FIG. 1 is commonly known as a scan line 114. Address lines 110 preferably comprise one or more tiers of a conductor such as molybdenum or chromium that is readily applied in the fabrication process and that exhibits desirable characteristics in the array structure, such as adherence to underlying materials in the array and laser weldability. Respective ones of the scan and data lines are coupled to a plurality of respective active components 122, and the matrix of scan and data lines and the associated active components 122 form an active area 120 on wafer 100.

Each active component 122 typically is coupled through a switch device 116, for example, a thin film transistor (TFT), to one data line 112 and one scan line 114. In such an arrangement switch device 116 can be controlled by a signal on one address line, e.g., a scan line 114. Switch device 116 is disposed to selectively electrically connect the active device to a respective data line 112. Each active component 120 typically comprises an electronically controlled device such as a liquid crystal cell, a photodiode, or the like.

A grounding ring 130 typically is disposed around the periphery of active area 120 on wafer 100. Grounding ring 130 advantageously comprises the same type of electrically conductive material as address lines 110. Grounding ring 130 is commonly used in the fabrication and testing process for the wafer and then removed when the wafer is ready for installation in an end-use product or operational equipment.

In accordance with this invention, one or more electrically conductive static protection lines 140 are disposed on wafer 100 so that for at least a portion of its length the axis of each static protection line is oriented at substantially right angles to the axis of the portions of address lines 110 extending from active area 120 towards the edges of wafer 100 so that the address lines cross over each static protection line. As used herein, "cross over" refers to an electrically conductive component being disposed in a layer above another electrically conductive component that is in a different layer on the structure on wafer 100, with the electrically conductive components being separated by at least a layer of dielectric material. For ease of discussion, one component is said to cross over another, although for the purposes of this invention it is not critical to identify which of the electric components is closer to substrate 105 and which is farther from the substrate.

Each static protection line 140 comprises an electrically conductive material such as molybdenum, chromium, or the like, and advantageously comprises the same material as address lines 110 or grounding ring 130. Each static protection line is typically electrically coupled to grounding ring 130 through being hard wired, e.g. directly welded to or integrally formed as a part of, the grounding ring or through coupling capacitors (not shown).

Each static protection line 140 further is electrically insulated from the crossing-over address lines by a layer of dielectric material. Preferably, static protection lines 140 and address lines 110 are laid down in the fabrication process so that dielectric material separating the layers of electrically conductive components in active area 120 similarly separates static protection lines 140 from address lines 110. For example, silicon nitride or silicon oxide are commonly used as dielectric materials in the fabrication of an active array for separating data and scan lines 112, 114, and also in the formation of active components 122. Further, semiconductor layers of intrinsic silicon (i-Si) and n or p doped silicon are commonly used in forming TFTs and active components 122. For ease of fabrication (e.g., obviating the necessity of a separate process step to remove these non-dielectric materials in the area around the static protection lines), layers of these non-dielectric materials can similarly be disposed between a static protection line and a crossing-over address line.

Figure 2A:
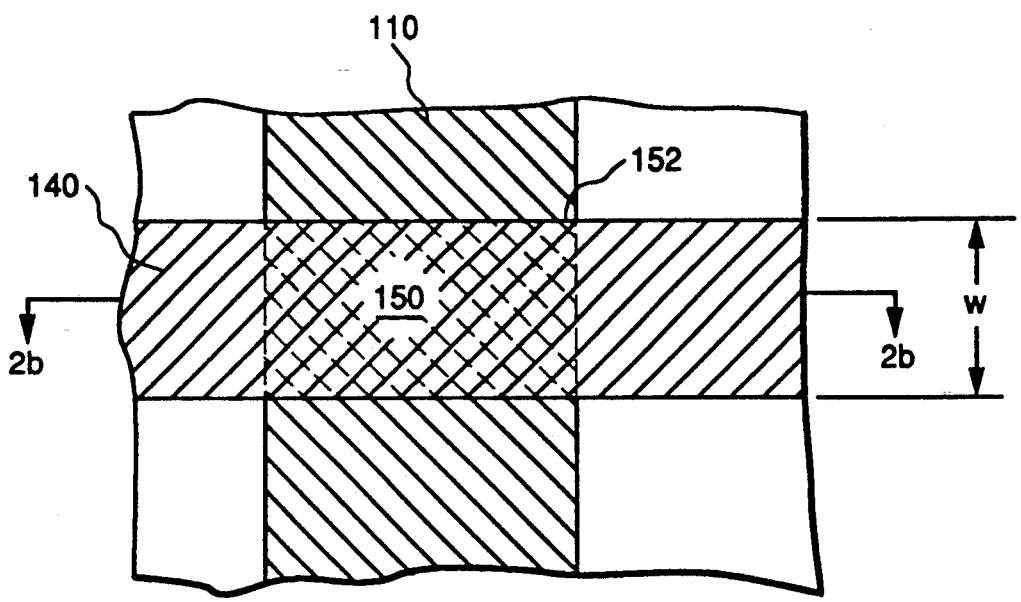
FIG. 2a is a plan view of a crossover point at which a static protection capacitor in accordance with this invention is located.

In accordance with this invention, at least one static protection capacitor 150 is disposed on wafer 100 and is electrically coupled to at least one respective address line 110. Static protection capacitor 150 is preferably disposed at a crossover area 152 between respective ones of static protection lines 140 and address lines 110. A more detailed view of crossover area 152 is illustrated in FIG. 2a, in which, for example, address line 110 is disposed on wafer 100 at a level in the structure on the wafer that is below static protection line 140. The extent of crossover area 152 is determined by the portion of static protection line 140 that overlies address line 110.

Figure 2B:
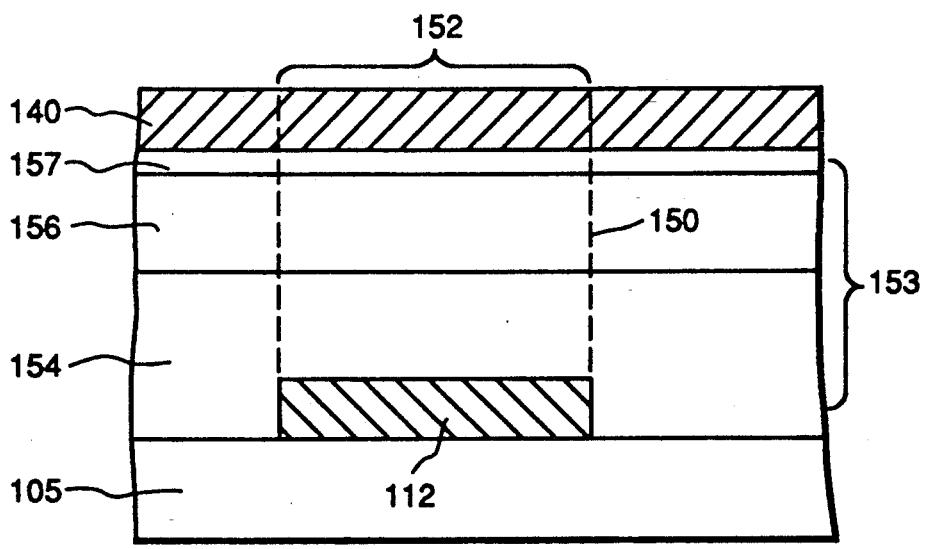

FIG. 2b illustrates a cross-sectional view of one embodiment of a static protection capacitor in accordance with this invention. Data line 112 (as an example of an address line used for the purpose of forming the capacitor) is disposed on substrate 105 and static protection line 140 crosses over data line 112 at substantially right angles. The portion of each data line 112 that underlies static protection line 140 comprises one of the electrodes in a respective static protection capacitor 150, shown in phantom in FIG. 2b. The portion of overlying static protection line 140 in crossover area 152 comprises the second electrode of the capacitor. A capacitor dielectric layer 153 is disposed therebetween, and comprises at least a dielectric material 154, such as silicon nitride or silicon oxide. Dependent on the materials used in the fabrication of components in the active area of the array, capacitor dielectric layer 153 also typically comprises a layer of intrinsic silicon 156 and a doped silicon layer 157, e.g., silicon doped to exhibit n type conductivity.

The capacitance of static protection capacitor 150 is a function of the area of the two electrodes forming the capacitor, the dielectric constant of the material forming the dielectric layer, and the separation of the two conductors. Typically, the thickness (and hence the separation of the two conductors, e.g., the respective overlying portions of data line 112 and static protection line 140) is determined by the fabrication steps to form components in the active area of wafer 100. The capacitance of static protection capacitor 150 is selected (in the fabrication process) by determining the width W (FIG. 2a) of static protection line 140, with smaller widths resulting in a smaller capacitance for the static protection capacitor. The capacitance of each static protection capacitor 150 is selected to protect the first and second layers of electrically conductive components. The static protection capacitor exhibits breakdown at a threshold static voltage that is sufficiently below the static voltage that would cause breakdown between respective ones of the scan and data lines.

In accordance with this invention a separate static protection capacitor 150 is formed at each crossover area between respective ones of the static protection lines and address lines. Each static protection line 140 preferably crosses over a plurality of address lines so as to form a respective static protection capacitor providing protection to each address line. Multiple static protection lines 140 extending across the extensions of address lines at one end of wafer 100, as illustrated in FIG. 1, provide multiple separate static protection capacitors for each address line. It is thus possible to provide backup protection from static discharge for each address line by the use of multiple static protection lines 140, and each static protection line 140 provides a separate static protection capacitor for each address line it crosses over.

An area that is often damaged by static discharge in an unprotected active array is the point where scan and data lines cross over one another, separated by at least a dielectric material and perhaps other material, such as intrinsic silicon and the like. In order to provide a static protection capacitor having a selected capacitance to protect such points from static discharge during manufacturing, testing, or handling of the array, the width of each static protection line 140 is advantageously selected to be less than the width of the address lines 110. The smaller width of the static protection line compared to the address line results in crossover area 152 being smaller than the area of the overlapping scan and data lines at points in the matrix of address lines where they overlie one another; as a consequence the capacitance of the static protection capacitor formed between data line 112 and static protection line 140 is less than the capacitance between the data line and an overlapping scan line. In the event of a high static voltage or rapid change in the static voltage, the lower capacitance static protection capacitor will exhibit electrical breakdown (e.g., structural breakdown of the intervening dielectric layer, allowing a substantially conductive path to form to allow current to flow from one conductor of the capacitor to the other) before the dielectric between the overlapping scan and data line will break down.

In the event static protection capacitor 150 exhibits electrical breakdown (or fails), it can be readily isolated using laser ablation or similar wafer repair techniques by severing (to break the electrical connection) static protection line 140 on either side of the failed static protection capacitor. The remaining static protection capacitors formed at crossover areas along a given static protection line on which a failed static protection capacitor has been isolated continue to be functional.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An electrical-array wafer protected against damage due to static voltages, comprising:
   a substrate;
   a first plurality of electrically conductive address lines disposed on said substrate in a first layer;
   a second plurality of electrically conductive address lines disposed on said substrate in a second layer, said first and second pluralities of address lines comprising a plurality of data and scan lines respectively, said data and scan lines being electrically insulated from one another;
   at least one static capacitor electrically coupled to said first plurality of electrically conductive address lines, each of said at least one static capacitors comprising a first electrode, a second electrode, and a dielectric layer disposed therebetween, said first electrode comprising a portion of one of said address lines; and
   a plurality of electrically conductive static protection lines, each of said static protections lines being disposed in spaced relation to respective ones of said address lines and separated therefrom by said dielectric layer, each of said static protection lines being disposed so that portions thereof cross over respective ones of said address lines at respective crossover points to comprise said second electrode in respective ones of said static capacitors;
   each of said static capacitors having a predetermined capacitance and being adapted to electrically break down at a selected threshold static potential so as to short the electrically conductive address line exposed to the static potential to one of said static protection lines to thereby prevent dissipation of static potential between said first and second plurality of electrically conductive components.

2. The wafer of claim 1 wherein said dielectric layer comprises one of the group consisting of silicon nitride and silicon oxide.

3. The wafer of claim 2 wherein said dielectric layer further comprises a layer of intrinsic silicon.

4. The wafer of claim 1 wherein said dielectric layer comprises the same material disposed between said scan and said data lines.

5. The wafer of claim 1 wherein said second electrode has a width less than the width of said first electrode.

6. The wafer of claim 1 further comprising a grounding ring disposed on said wafer and electrically coupled to said static protection line.

7. The wafer of claim 6 wherein said static protection line is electrically coupled to said grounding ring by at least one coupling capacitor.

8. The wafer of claim 6 wherein said static protection line is hard wired to said grounding ring.

9. The wafer of claim 1 further comprising a plurality of liquid crystal cells, each of said cells being electrically coupled to a respective one of said scan lines and to a respective one of said data lines.

10. The wafer of claim 1 further comprising a plurality of photodiodes, each of said photodiodes being electrically coupled to a respective one of said scan lines and to a respective one of said data lines.

* * * * *